US008929229B2

(12) United States Patent
Berge

(10) Patent No.: US 8,929,229 B2
(45) Date of Patent: Jan. 6, 2015

(54) METHOD ALLOWING A MONITORING SYSTEM OF THE NETWORK OF AN OPERATOR TO CLASSIFY IP FLOWS

(75) Inventor: Christian Berge, Artannes sur Indre (FR)

(73) Assignee: Infovista SA, Les Ulis (FR)

( * ) Notice: Subject to any disclaimer, the term of this patent is extended or adjusted under 35 U.S.C. 154(b) by 403 days.

(21) Appl. No.: 12/728,967

(22) Filed: Mar. 22, 2010

(65) Prior Publication Data

US 2010/0246426 A1 Sep. 30, 2010

(30) Foreign Application Priority Data

Mar. 25, 2009 (FR) ..................................... 09 51943

(51) Int. Cl.
*H04L 12/26* (2006.01)
*H04L 12/56* (2006.01)
*H04L 12/851* (2013.01)

(52) U.S. Cl.
CPC .......... *H04L 43/026* (2013.01); *H04L 47/2441* (2013.01)
USPC ........ 370/252; 370/389; 370/392; 370/395.5; 370/401

(58) Field of Classification Search
USPC ......... 370/252, 389, 392, 395.2, 395.21, 390, 370/401; 709/224
See application file for complete search history.

(56) References Cited

U.S. PATENT DOCUMENTS

| | | | | |
|---|---|---|---|---|
| 7,062,566 B2 * | 6/2006 | Amara et al. | ................. | 709/229 |
| 7,457,244 B1 * | 11/2008 | Ye et al. | ........................ | 370/230 |
| 7,525,969 B2 * | 4/2009 | Grant | ........................... | 370/392 |
| 7,990,969 B2 * | 8/2011 | Pasko et al. | .................... | 370/392 |
| 8,072,894 B2 * | 12/2011 | Shi et al. | ......................... | 370/252 |
| 8,675,656 B2 * | 3/2014 | Guichard et al. | ............. | 370/392 |
| 2002/0083175 A1 | 6/2002 | Afek et al. | | |
| 2002/0114274 A1 * | 8/2002 | Sturges et al. | ................ | 370/229 |
| 2004/0006708 A1 * | 1/2004 | Mukherjee et al. | ............ | 713/201 |
| 2007/0121615 A1 * | 5/2007 | Weill et al. | ..................... | 370/389 |
| 2008/0002697 A1 | 1/2008 | Anantharamaiah et al. | | |
| 2008/0049752 A1 * | 2/2008 | Grant | ............................ | 370/392 |
| 2008/0279111 A1 | 11/2008 | Atkins et al. | | |
| 2009/0086728 A1 * | 4/2009 | Gulati et al. | ................... | 370/389 |
| 2010/0043068 A1 * | 2/2010 | Varadhan et al. | ............... | 726/15 |

OTHER PUBLICATIONS

Sadasivan, G., Cisco Systems et al., "Architecture Model for IP Flow Information Export, draft-ietf-ipfix-arch-02.txt", pp. 1-28, Oct. 2003.
Sadasivan, G., Cisco Systems et al., "Architecture for IP Flow Information Export, draft-ietf-ipfix-arch-12", pp. 1-32,Sep. 2006.

* cited by examiner

*Primary Examiner* — Candal Elpenord
(74) *Attorney, Agent, or Firm* — Greer, Burns & Crain, Ltd.

(57) ABSTRACT

A method is provided for allowing a monitoring system to classify, by entity, IP "accounting" elements passing through routers of a network of a service provider, these entities being arranged in different sites connected to the network. The method includes:

each site is associated with an interface of a router to which that site is connected, and during analysis by the monitoring system of an accounting element originating from a router, information relating to the source interface and destination interface contained in this accounting element is used in order to identify the source and destination sites and to classify this accounting element with respect to the correct source or destination entity.

5 Claims, 1 Drawing Sheet

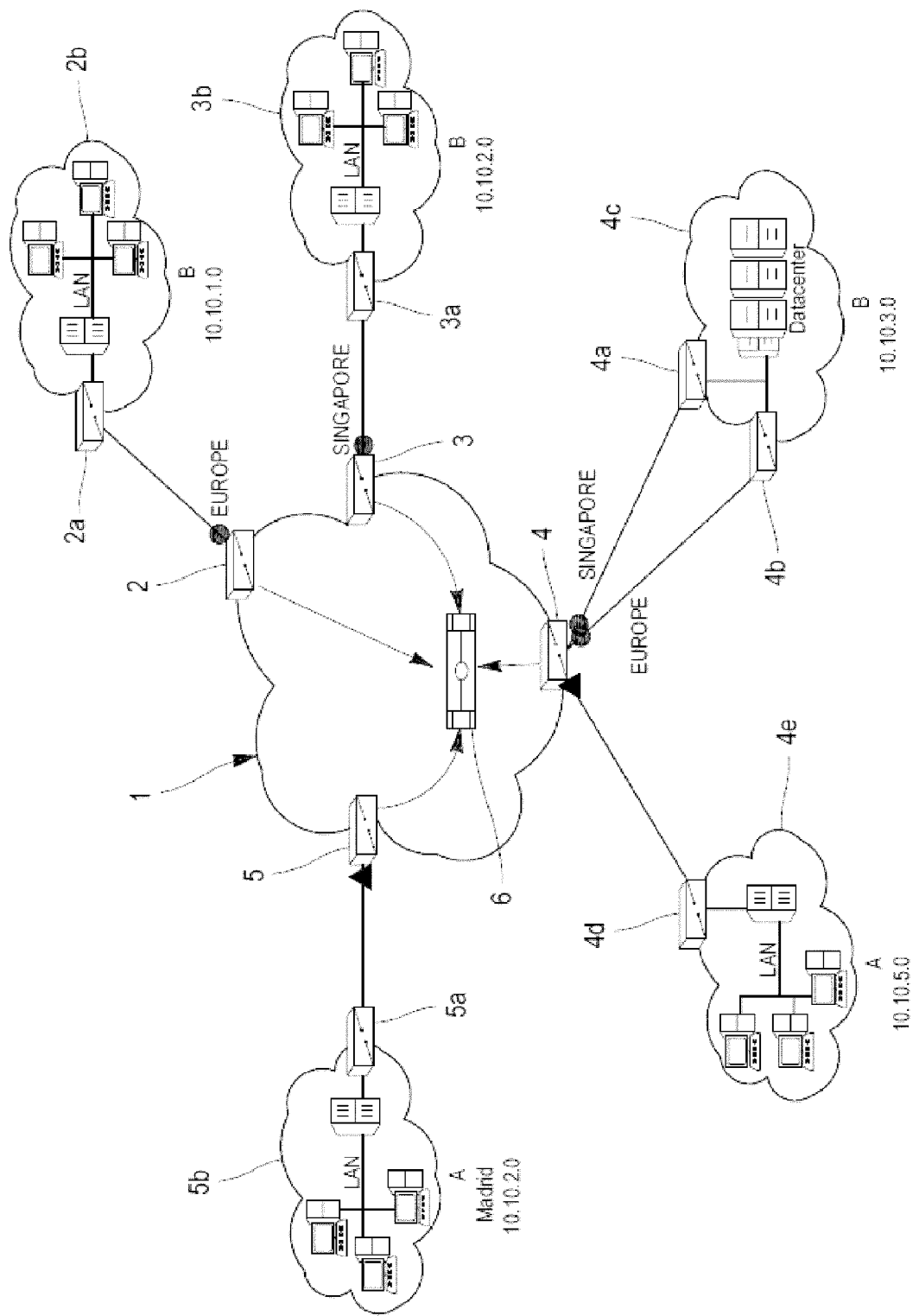

METHOD ALLOWING A MONITORING SYSTEM OF THE NETWORK OF AN OPERATOR TO CLASSIFY IP FLOWS

BACKGROUND

The present invention relates to a method allowing a monitoring system to classify, by entity, IP (Internet Protocol) flows called accounting elements passing through routers or switches of a network of a service provider, these entities being arranged in different sites.

The present invention has an application in the measurement of performance and monitoring of the quality of service of an information system. It relates in particular to the collection of IP accounting information originating from routers in such a way as to produce real time monitoring, statistics or also registrations.

Generally, the increasing complexity of information systems integrating in particular, client-server architectures and integrated local area networks, makes effective management of the quality of service more and more difficult within these systems. On the one hand, the administrators and managers of these information systems are led to adopt a service approach towards users and to operate as service providers concerned about the quality of services provided, at the same time as being faced with reductions in operating costs, and on the other hand, the users of these services demand yet higher levels of quality of service.

Control over the quality of service involves a reliable feedback system of relevant information originating from the different resources of the information system. To do this, the large-volume performance data references residing in the network equipment, in the systems and in the software applications must be exploited.

One of the methods used in order to analyse the IP flows passing through the network of an operator consists of configuring the PE (Provider Edge) routers so as to make them generate then transmit the accounting information (via NetFlow, sFlow, IPFix etc.) to one or more systems capable of analysing and aggregating them.

In concrete terms, by configuring the PE routers in order to make them transmit, for example, records according to the NetFlow V5 protocol to a monitoring system, it is possible to generate volumetric statistics and flow matrices broken down by protocol, IP address, TCP/UDP port, etc. for all of the traffic which has passed through the network of the operator.

However, in the specific context of the network of an operator, it is common for the IP addressing plans in force on the sites of the different clients to overlap, i.e. that two different machines or applications in different client sub-networks connected to the same network operator (service provider) have the same IP address. When this happens, the significance of the statistics produced by the monitoring system on the basis of IP addresses can be changed dramatically.

By operator, is meant an enterprise which offers network services to different clients. The "network" resource is therefore not dedicated to one particular client but shared between several clients, which is where the risks of the overlapping of addressing plans comes from.

In fact, 2 entities sharing the same IP address are viewed as one and the same entity on which flows of different types will accumulate.

This situation is yet more critical when, in such monitoring system, the IP addresses are used to identify, not only the servers and the main applications, but also the ownership of the latter and of their clients at different geographical sites.

The correlation between IP address and application is then carried out via the establishment by the client of an "application repository" which associates a set of IP addresses and ports for a given protocol (UDP/TCP) with each application The correlation between IP address and geographical site is, carried out via the establishment by the client of a "geographical repository" which associates a set of IP addresses IP with each geographical site.

The overlapping of the IP addressing plans automatically leads to an overlapping of the application repositories and geographical repositories of the different clients.

The result of this overlapping of the repositories of the different clients means that it is impossible for the monitoring system to decide reliably whether an IP address belongs to one or another geographical site or the identification of an application server.

SUMMARY

The present invention aims to overcome the above drawbacks by proposing a novel method for efficiently collecting and ordering relevant information from the routers of a network operator.

Another purpose of the invention is to propose a method which is simple to implement using existing tools.

At least one of the aforementioned objectives is achieved with a method allowing a monitoring system to classify by entity IP ("Internet Protocol") flows called accounting elements passing through the routers or switches of a network of a service provider, these entities being arranged in different sites connected to said network. The method according to the invention comprises the following steps:

each site is associated with an interface of a router or switch to which this site is connected, and during an analysis by the monitoring system of an accounting element originating from a router or switch, information relating to the source interface and destination interface contained in this accounting element is used in order to identify the source and destination sites and to classify this accounting element with respect to the correct source or destination entity.

With the method according to the invention, information relating to the output and input interfaces of the routers is used in order to distinguish the IP flows. Each interface of a router of the network is associated with a given site. In addition to the IP addresses which are collected conventionally, with the method according to the invention other ranking criteria are added, these ranking criteria are information relating to output and input interface or destination and source interface. Each source address is associated with its site. According to the protocol used, the routers are correctly configured so that this information relating to the interfaces is collected by the monitoring system.

According to a feature of the invention, each site is identified by a geographical repository which associates a set of IP addresses with each geographical site. The geographical repository can be a look-up table showing the ranges of IP addresses and their corresponding geographical locations such as buildings, regions, countries, etc. In addition to or as a variant of the above, each site is identified by an application repository which associates a set of IP addresses and ports for a given protocol with each application of an entity.

According to the invention, said routers are so-called "Provider Edge" routers. Moreover, each entity comprises at least one so-called "Customer Edge" router and at least one application server.

Advantageously, the monitoring system uses the Netflow protocol for collecting the accounting elements from the routers.

According to an advantageous implementation of the invention, the entities are distributed in groups, each group comprising an IP addressing plan; and the IP addressing plans of different groups overlap.

The present invention therefore allows the production of an IP addressing plan, in a sub-network, independently of the addressing plans of the other sub-networks, these sub-networks being connected to a single network operator.

BRIEF DESCRIPTION OF THE DRAWING

Other advantages and characteristics of the invention will become apparent on examination of the detailed description of an embodiment which is in no way limitative, and FIG. 1, which is a general view of a of an operator's network according to the present invention.

DETAILED DESCRIPTION

On the single FIG. 1 a network 1 of a service provider according to the invention is shown. This network comprises routers 2 to 5 of PE for "Provider Edge" type. A monitoring system 6 is connected to each of the PE routers so as to collect the accounting information passing through these PE routers. Each PE router is intended for a given geographical place and/or for given applications. These routers are connected to the sub-networks of clients A and B.

For example, the router 2 of the network operator 1 is intended for Europe and is connected to a LAN sub-network 2b of the client B via a CE ("Customer Edge") router 2a. The IP address for this LAN sub-network is for example 10.10.1.0.

In the same way, the router 3 of the network operator 1 is intended for Singapore and is connected to a LAN sub-network 3b of the same client B via a CE router 3a. The IP address for this LAN sub-network is for example 10.10.2.0.

The router 4 of the network operator 1 is, on the other hand, intended for several geographical places, Singapore and Europe, but also for several applications. In fact, this router 4 is connected to a "Datacenter" sub-network 4c of the same client B via a CE router 4a using a VPN ("Virtual Private Network") link through Singapore and via a CE router 4b using a VPN ("Virtual Private Network") link through Europe. The two CE routers 4a and 4b form part of the same sub-network 4c. The IP address for this "Datacenter" sub-network 4c is for example 10.10.3.0.

The PE router 4 also manages a LAN sub-network 4e of the client A via a CE router 4d. The IP address for this LAN sub-network is for example 10.10.5.0.

The router 5 of the network operator 1 is intended for the city of Madrid in Spain and is connected to a LAN sub-network 5b of the client A via a CE router 5a. The IP address for this LAN sub-network is for example 10.10.2.0.

The links between the PE routers and the CE routers are of VPN type.

Each client has an IP addressing plan which is his own. But it can be seen that when these sub-networks are connected with network 1 of the service provider, problems regarding correspondence between entity and IP address could occur as the different entities between clients A and B have the same IP address: 10.10.2.0.

In order to avoid this problem according to the invention, it is ensured that each item of accounting information generated by the PE routers correctly actually contains the concepts of source and destination interface. In particular, if the communication between the PE routers 2-5 and the monitoring system 6 is carried out using the NetFlow V9 protocol with models or "templates" defined by the user, the presence of these "source interface" and "destination interface" fields is ensured in the "templates".

The method according to the invention is implemented within the monitoring system, and consists of:

locating the interfaces of the PE routers which are dedicated to the client sites then to associate the appropriate application and geographical repositories with each of them, as indicated in FIG. 1: the interfaces associated with the application and geographical repositories of client A being identified by triangles, whilst the interfaces associated with the application and geographical repositories of client B are identified by circles; then during the analysis of an accounting element originating from a PE router, using the information relating to the source and destination interfaces contained in this element in order to point to the corresponding repositories.

In fact it can be estimated that provided that an IP message is transmitted over an interface dedicated to a client, its IP address can only be in accordance with the addressing plan of the client in question.

The table below illustrates an example of application and geographical repositories between clients A and B of the network operator 1.

| Client A: | Client B: |
| --- | --- |
| Application repository: | Application repository: |
| Application A1 = IP 10.10.2.20/ TCP 1532 | Application B1 = IP 10.10.2.20/ TCP 1532 |
| Application A2 = IP 10.10.2.21/ TCP 1532 | Application B2 = IP 10.10.2.23/ TCP 1532 |
| Geographical repository: | Geographical repository: |
| Madrid = 10.10.2.0-10.10.2.255 | Europe = 10.10.1.0-10.10.1.255 |
| Paris = 10.10.5.0-10.10.5.255 | Singapore = 10.10.2.0-10.10.2.255 |
| | Datacenter = 10.10.3.0-10.10.3.255 |

In the case where two separate entities use the same IP address: 10.10.2.15 it is found that:

Entity A is situated on the Madrid site of client A

Entity B is situated on the Singapore site of client B

With a system according to the prior art, it is impossible to distinguish the two entities, the information relating to the flows originating from entity A and from entity B are therefore unfortunately cumulated. Moreover, it is impossible to decide to which site the address 10.10.2.15 is allocated, in fact, there are two possible candidates: Madrid and Singapore.

On the other hand, with the system according to the present invention, when the information relating to the IP address 10.10.2.15 is fed back by an interface allocated to client A, the repository of client A is used by the monitoring system. The geographical site is automatically recognised as being Madrid and the flows are accounted for on entity A. And when the information relating to the IP address 10.10.2.15 is fed back by an interface allocated to client B, the repository of client B is used by the monitoring system. The geographical site is automatically recognised such as being Singapore and the flows are accounted for on entity B.

Thus, with the method according to the invention, the concepts of source and destination interfaces conveyed in the IP accounting information (NetFlow, sFlow, IPFix, etc. . . . ) information are used in order to reliably produce the functions of classification, counting, breakdown and correlation with the repositories specific to each client, of the IP flows passing through the network of an operator even when the IP addressing plans in force on the sites of the clients overlap.

Of course, the invention is not limited to the examples which have just been described and numerous adjustments can be made to these examples without exceeding the scope of the invention.

The invention claimed is:

1. A method for operating a monitoring system:

classifying, by entity, IP (Internet Protocol) flows called accounting elements passing through routers or switches of a network of a service provider, the entities being arranged at different sites connected to said network and distributed in groups, each group comprising an IP addressing plan, wherein the IP addressing plans of different groups overlap;

associating each site with an interface of a router or switch to which this site is connected wherein each site is identified by a geographical repository which associates a set of IP addresses with each geographical site;

associating each of said accounting elements of said entities in said groups with a source interface and a destination interface;

identifying source and destination sites of each of said accounting elements based on said source interface and said destination interface associated with each of said accounting elements; and classifying each of said accounting elements with respect to one of a correct source entity or a correct destination entity.

2. The method according to claim 1, wherein each site is identified by an application repository which associates a set of IP addresses and ports for a given protocol with each application of an entity.

3. The method according to claim 1, wherein said routers are so-called "Provider Edge" routers.

4. The method according to claim 1, wherein each entity comprises at least one so-called "Customer Edge" router and at least one application server.

5. The method according to claim 1, wherein the monitoring system uses the Netflow protocol for collecting the accounting elements from the routers.

* * * * *